(12) United States Patent
Quail

(10) Patent No.: US 9,865,174 B2
(45) Date of Patent: Jan. 9, 2018

(54) SENSORY FEEDBACK ADAPTER FOR USE WITH A LASER BASED COMBAT TRAINING SYSTEM

(71) Applicant: Jeffrey James Quail, St. Andrews (CA)

(72) Inventor: Jeffrey James Quail, St. Andrews (CA)

( * ) Notice: Subject to any disclaimer, the term of this patent is extended or adjusted under 35 U.S.C. 154(b) by 193 days.

(21) Appl. No.: 14/736,816

(22) Filed: Jun. 11, 2015

(65) Prior Publication Data

US 2015/0364053 A1 Dec. 17, 2015

Related U.S. Application Data

(60) Provisional application No. 62/011,709, filed on Jun. 13, 2014.

(51) Int. Cl.
G09B 9/00 (2006.01)

(52) U.S. Cl.
CPC .................... *G09B 9/003* (2013.01)

(58) Field of Classification Search
CPC .......... G09B 9/003; F41A 33/00; F41A 33/02; F41A 33/04; F41A 33/06; F41G 3/26
See application file for complete search history.

(56) References Cited

U.S. PATENT DOCUMENTS

| | | | |
|---|---|---|---|
| 5,904,621 A * | 5/1999 | Small ...................... | F41A 33/02 434/22 |
| 7,976,309 B1 * | 7/2011 | Jones .................... | F41G 3/2622 434/11 |
| 8,267,691 B1 * | 9/2012 | Ferris ...................... | F41A 33/00 434/11 |
| 2004/0064319 A1 * | 4/2004 | Neuhauser ............ | G10L 19/018 704/273 |
| 2004/0073127 A1 * | 4/2004 | Istvan .................. | A61B 5/0006 600/513 |
| 2006/0135056 A1 * | 6/2006 | Rydgren ................ | H01R 23/70 455/1 |
| 2014/0081175 A1 * | 3/2014 | Telfort ................... | A61B 7/026 600/586 |

\* cited by examiner

*Primary Examiner* — Timothy A Musselman
(74) *Attorney, Agent, or Firm* — Ryan W. Dupuis; Ade & Company Inc.; Kyle R. Satterthwaite

(57) ABSTRACT

An adapter assembly permits sensory feedback such as a pain penalty to be incorporated into a combat training system of the type which includes simulated weapons which output a laser hit signal representative of a projectile and user monitoring devices worn by participants having laser sensors to provide an indication when a participant is hit by a simulated projectile in a combat training exercise. The adapter assembly works with an electrical impulse device also worn by the participants to deliver an electrical shock to the participant in response to receiving an activation signal. More particularly, the adapter assembly has input sensor for sensing when a user monitoring device indicates a hit to the user, and a signal output for generating an activation signal which can be received by the electrical impulse device to shock the participant when hit.

19 Claims, 5 Drawing Sheets high# SENSORY FEEDBACK ADAPTER FOR USE WITH A LASER BASED COMBAT TRAINING SYSTEM This application claims the benefit under 35 U.S.C. 119(e) of U.S. provisional application Ser. No. 62/011,709, filed Jun. 13, 2014.

FIELD OF THE INVENTION

The present invention relates to an adapter device for communicating between components of a laser based training system for simulating combat, for example a Multiple Integrated Laser Engagement System (MILES), and an electrical impulse device for providing sensory feedback such as an electrical shock to participants of the simulated combat using the laser based training system, and more particularly the present invention relates to an adapter device for actuating the electrical impulse device when a user monitoring device of the laser based training system worn by one of the participants records a simulated projectile hit to the participant during simulated combat.

BACKGROUND

In order to train military and law enforcement type personnel, various training systems have been developed for simulating combat type environments. One such training system known as M.I.L.E.S., which stands for Multiple Integrated Laser Engagement System, is used by military forces around the world for training in the use of firearms and other battle weapons. The device is worn by the soldier and consists of numerous laser sensors. Weapons used during this training are fitted with a laser such that when the weapon is fired with blank rounds, it sends a laser pulse in the direction the weapon is being aimed to simulate a projectile. If a soldier is hit by the laser while wearing the M.I.L.E.S. system, a loud audio signal is activated along with a red light, to indicate that they have been hit. Thousands of these systems are already owned and in use by the US military and other militaries around the world. One of the downfalls of the current M.I.L.E.S. system, is its inability to adequately elevate the stress in the soldier to train in the same mental state of acute stress they would experience in a real world battle.

SUMMARY OF THE INVENTION

According to one aspect of the invention there is provided in a combat training system comprising:
  i) a simulated weapon having an output arranged to wirelessly output a hit signal therefrom which is representative of a projectile in a combat training exercise;
  ii) a user monitoring device arranged to be worn by a user and including an input arranged to receive the hit signal from the simulated weapon and an indicator output arranged to output an notification which is indicative of the user being hit by a projectile in the combat training exercise in response to the hit signal being received by the input;
  an improvement comprising:
  i) an electrical impulse device arranged to be worn by the user and deliver an electrical shock to the user in response to receiving an activation signal; and
  ii) an adapter assembly arranged to be supported on the user and being configured to communicate between the user monitoring device and the electrical impulse device, the adapter assembly comprising:

an input sensor arranged to sense the notification output by the indicator output of the user monitoring device; and
a signal output arranged to transmit said activation signal to the electrical impulse device in response to the notification signal being sensed by the input sensor.

Preferably the combat training system with which the adapter assembly communicates comprises a simulated weapon and a user monitoring device from a Multiple Integrated Laser Engagement System.

According to a second aspect of the present invention there is provided a method of incorporating sensory feedback in a combat training system comprising a simulated weapon having an output arranged to wirelessly output a hit signal therefrom which is representative of a projectile in a combat training exercise and a user monitoring device arranged to be worn by a user and including an input arranged to receive the hit signal from the simulated weapon and an indicator output arranged to output a notification which is indicative of the user being hit by a projectile in the combat training exercise in response to the hit signal being received by the input, the method comprising:
  i) supporting an electrical impulse device on the user which is arranged to deliver an electrical shock to the user in response to receiving an activation signal; and
  ii) supporting an adapter assembly on the user which is configured to communicate between the user monitoring device and the electrical impulse device, in which the adapter assembly comprises i) an input sensor arranged to sense the notification output by the indicator output of the user monitoring device, and ii) a signal output arranged to transmit the activation signal to the electrical impulse device in response to the notification signal being sensed by the input sensor.

As described herein, the adapter assembly of the present invention relates to a M.I.L.E.S. external sensing and integration device that will allow other external devices to be activated when the M.I.L.E.S. gear is activated. More particularly, the adapter device of the present invention provides a quick and non-intrusive solution that will allow the owner of M.I.L.E.S. to integrate existing products into the operation of the system. For example, an electrical impulse device which delivers an electrical shock to the user, such as a StressX™ belt available by StressVest Inc. in Winnipeg, Canada, could be integrated into the system so it is activated when the MILES system activates. The StressX™ belt is a device that can deliver a pain penalty in the form of a safe, localized electric shock. The shock can be adjusted in numerous ways to enhance training of the students under stress. It can also provide a vibration to give feedback without creating stress. The device can be used in all levels of physical skills training, from static to stimulus-response to fully dynamic scenarios.

Preferably the adapter device would operate by sensing the M.I.L.E.S. gear activation through the following means: When the M.I.L.E.S. system is activated by receiving a laser strike to one of its sensors, it will emit an audio tone from its speaker. The speaker also emits an electromagnetic force. By placing an electromagnetic sensor over the speaker the adapter device will be able to identify when the M.I.L.E.S. system has been activated. The circuitry of the adapter device will then send a message to the external electrical impulse device to let it know that it has been activated.

Preferably the signal output of the adapter assembly comprises a wireless transmitter arranged to wirelessly transmit the activation signal.

Preferably the input sensor of the adapter assembly is supported in a sensor housing and the signal output of the adapter assembly is supported in an output housing, in which the sensor housing is independent of the output housing so as to be readily releasable from the output housing.

When the output housing includes a battery supported therein which is arranged to supply electrical power to the signal output, preferably a power connection is provided for connection between the sensor housing and the output housing such that the input sensor is arranged to be supplied by electrical power from the battery of the output housing.

Preferably a data cable is arranged to be connected between the sensor housing and the output housing so as to be arranged to communicate detection of the notification by the input sensor from the input sensor to the signal output in which the data cable is readily separable from at least one of the sensor housing and the output housing to enable separation of the sensor housing from the output housing and in which the power connection runs alongside the data cable within a common sheath.

When the sensor housing supports the input sensor of the adapter assembly therein, the sensor housing is preferably independent of the indicator output of the user monitoring device such that the sensor housing is readily releasable from the user monitoring device.

When the user monitoring device comprises a vest supporting an indicator housing therein which receives the indicator output therein, preferably the sensor housing further comprises at least one strap member coupled thereto which is selectively securable about the indicator housing of the user monitoring device.

When the indicator output comprises a speaker arranged to emit the notification as an audible notification, the input sensor of the adapter assembly is preferably arranged to detect the audible notification.

The input sensor may comprise an electromagnetic sensor arranged to sense an electromagnetic field from the speaker which is indicative of the audible notification. Preferably the electromagnetic sensor is received within a sensor housing comprising an inner side arranged to be supported against the speaker and an outer side opposite the inner side which includes electromagnetic shielding thereon.

The indicator output may be arranged to i) emit the audible notification in response to the hit signal being received by the input and ii) cease emitting the audible notification and audibly emit a reset notification within a prescribed duration of the cessation of the audible notification in response resetting of the user monitoring device. In this instance the adapter assembly preferably further comprises a controller including a timer so as to be arranged to i) generate the activation signal for transmission by the signal output to the electrical impulse device in response to the audible notification and ii) prevent generation of a second activation signal in response to receipt of the reset notification within the prescribed duration.

Alternatively the input sensor may comprise a microphone and a signal processor arranged to determine receipt of the notification by comparing an input signal of the microphone to prescribed signal criteria.

In yet a further embodiment when the indicator output comprises a light arranged to emit the notification as a visual notification, the input sensor of the adapter assembly may be arranged to detect the visual notification.

When the indicator output comprises a radio frequency notification, the input sensor of the adapter assembly may alternatively be arranged to detect the radio frequency notification.

A preferred embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
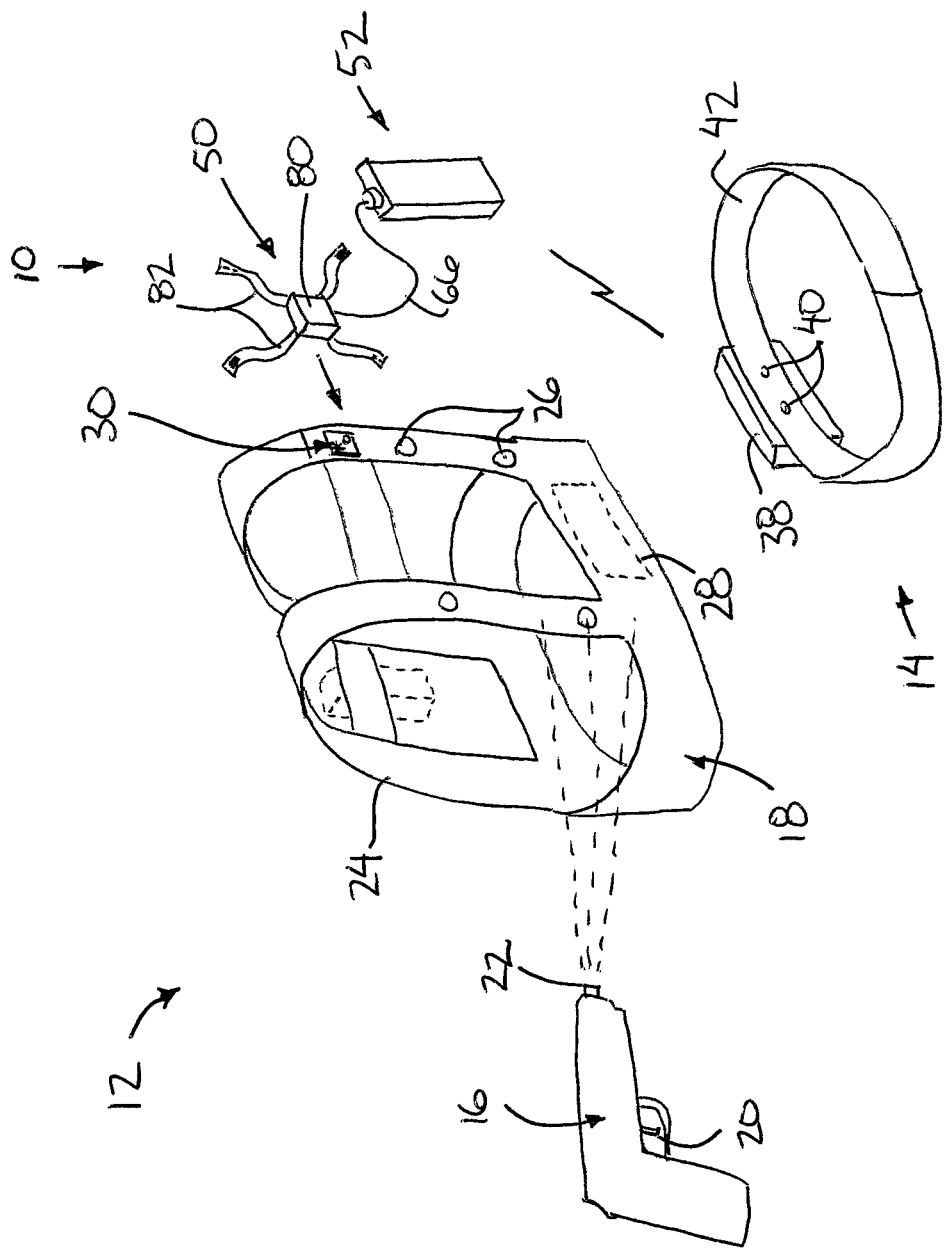
FIG. 1 is schematic representation of the combat training system having an adapter assembly according to the present invention incorporated therein.
Figure 2:
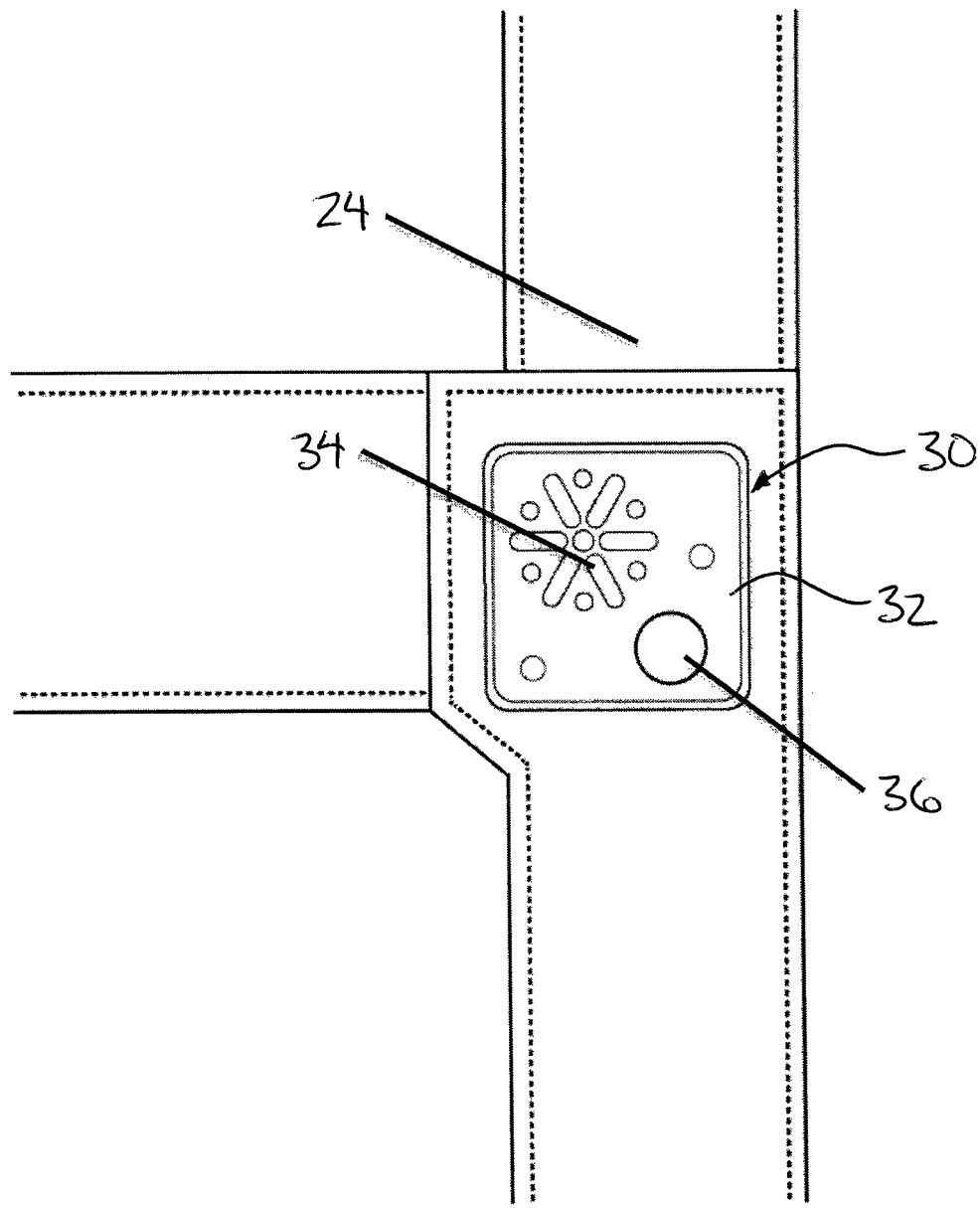
FIG. 2 is an elevational view of a portion of the vest of a prior art user monitoring device according to the combat training system according to FIG. 1.
Figure 3:
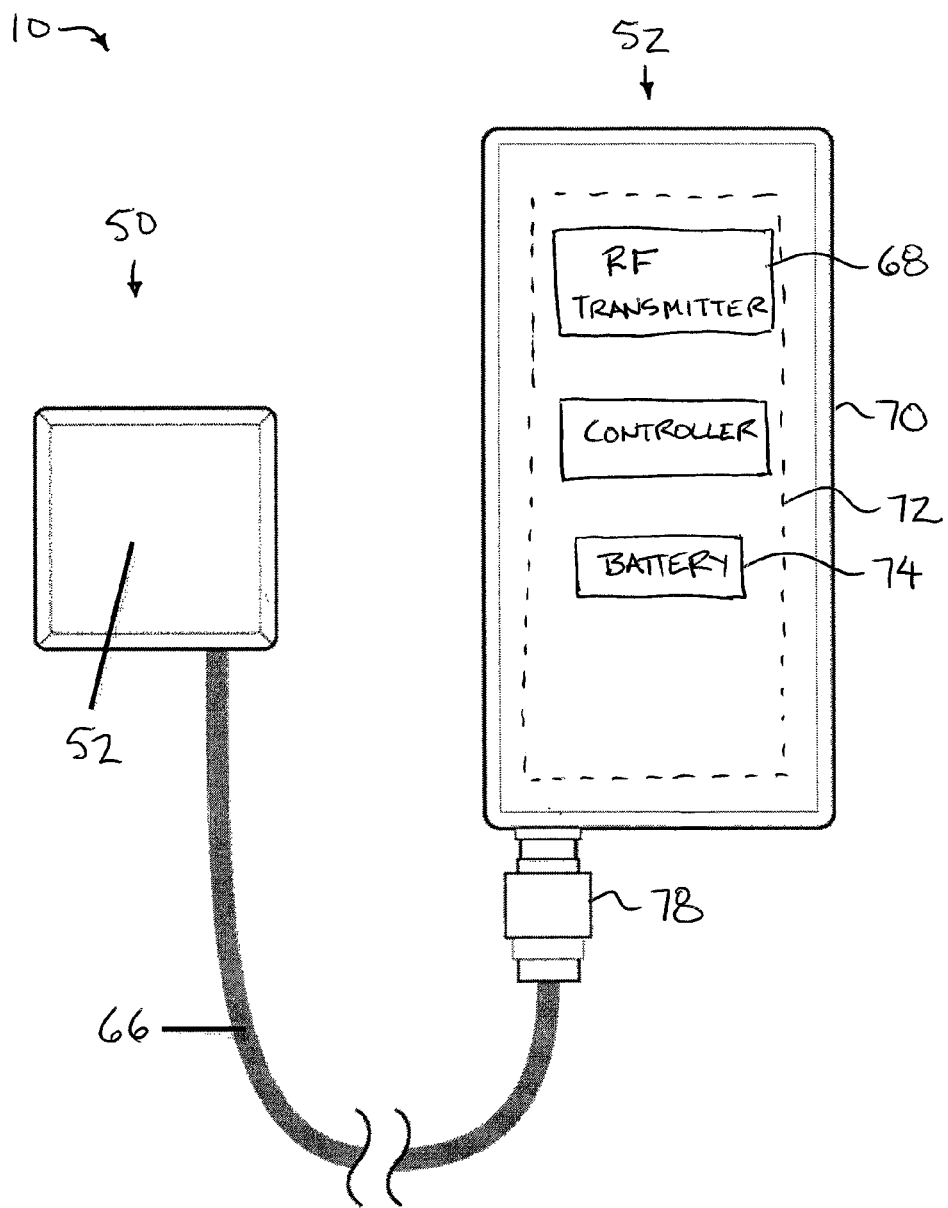
FIG. 3 is an elevational view of the adapter assembly according to the present invention.
Figure 4:
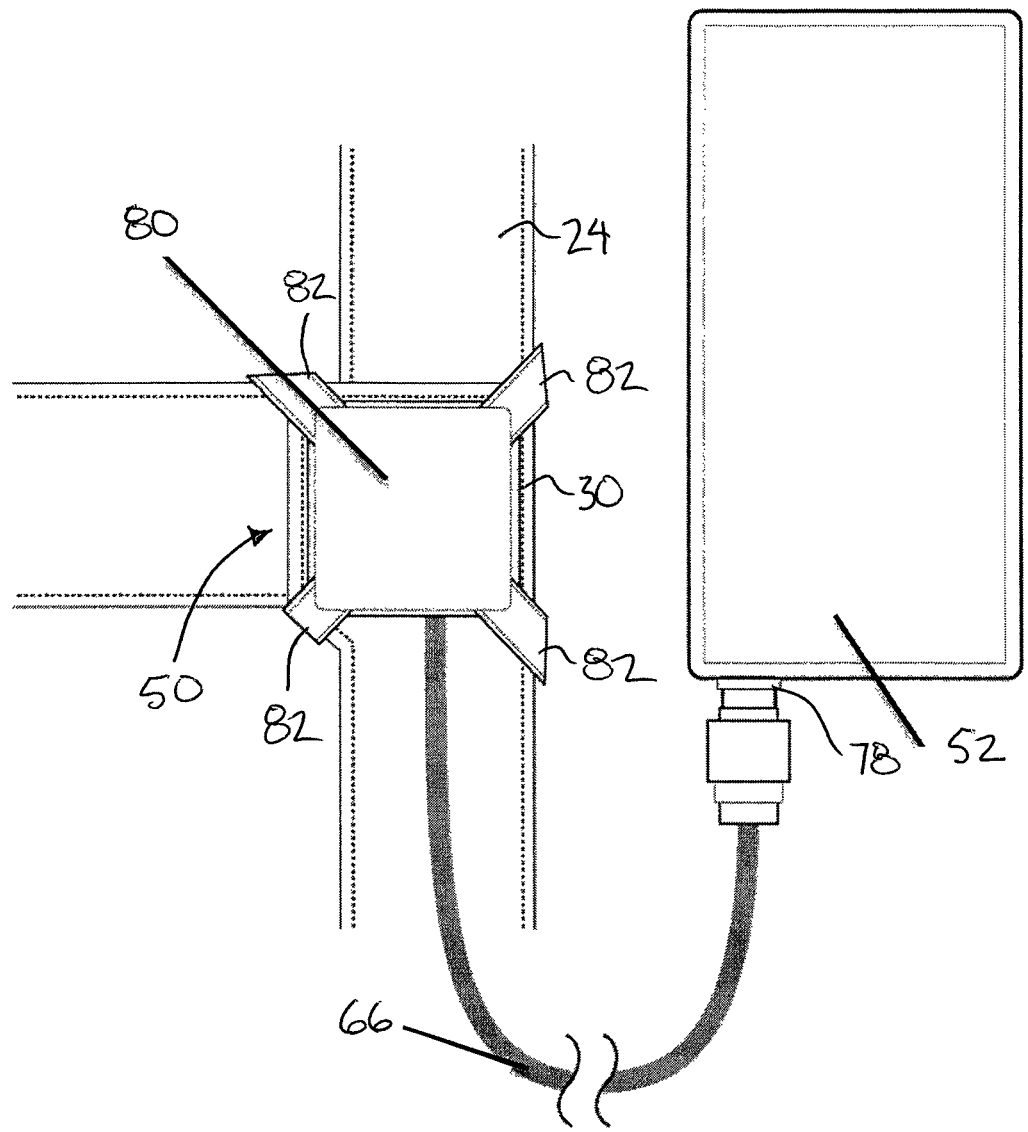
FIG. 4 is an elevational view of the adapter assembly according to the present invention supported on the vest of the user monitoring device according to FIG. 2.
Figure 5:
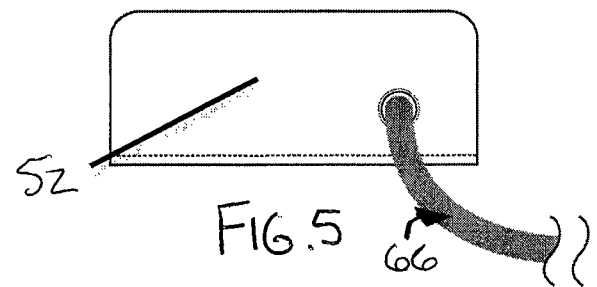
FIGS. 5, 6, and 7 are first end, second end, and top views respectively of the sensor housing of the adapter assembly.
Figure 6:
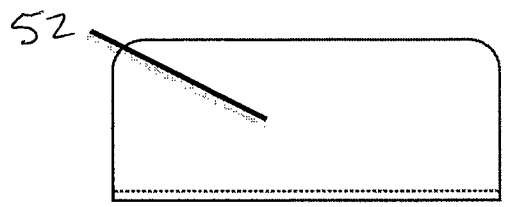
Figure 7:
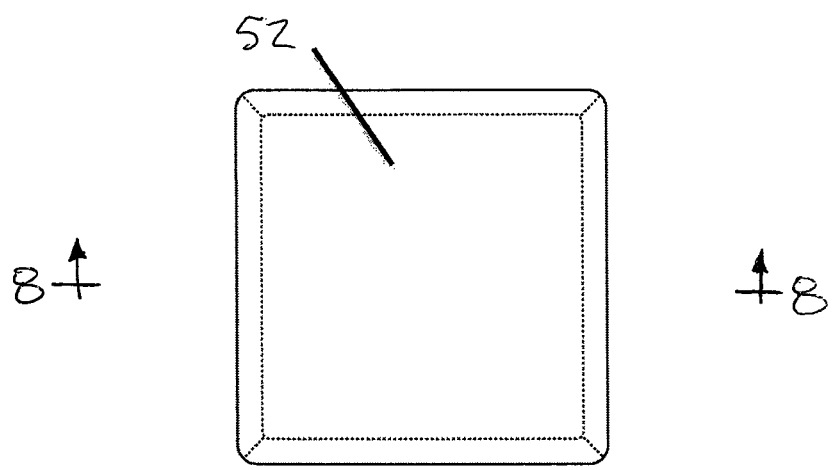
Figure 8:
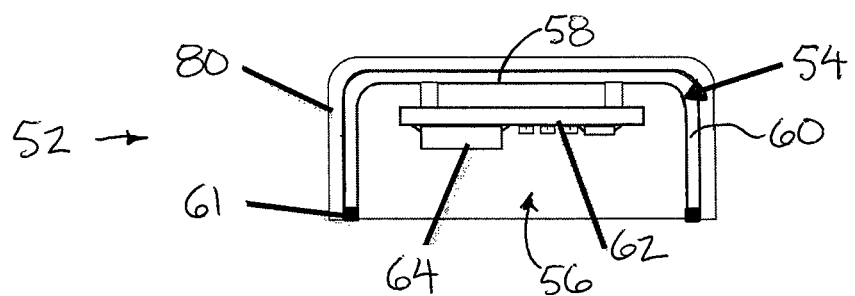
FIG. 8 is a sectional view along the line 8-8 of FIG. 7.

Referring to the accompanying figures, there is illustrated an adapter assembly generally indicated by reference numeral 10. The assembly 10 is particularly suited for use in a combat training system 12 for simulating a combat environment for training purposes. More particularly, the adapter assembly 10 allows for incorporation of a sensory feedback device, for example an electrical impulse device 14 into the combat training system 12.

The electrical impulse device 14 provides a pain penalty when the participants are hit with simulated projectiles in a combat training exercise such that a participant experiences some degree of stress during training to better simulate the real stresses of an actual combat environment.

The combat training system 12 described herein is a M.I.L.E.S. system for training a plurality of participants within a common training environment. Each participant is provided with a simulated weapon 16 and a user monitoring device 18. The simulated weapon 16 has the general appearance of a gun and further includes a manual trigger 20 for triggering by the user and a laser output 22 for projecting a coded cone beam laser from the stimulated weapon for simulating a projectile when a triggered by the user.

Each user monitoring device 18 comprises a vest 24, for example in the form of a harness of straps worn about the torso of the user. The user monitoring device further includes a sensor input 26 in the form of a plurality of sensors supported on the vest 24 for detecting receipt of a laser output from one of the simulated weapons.

The user monitoring device 18 further includes a controller 28 which records the laser strikes to the sensor input 26 to determine if the user has been hit by a simulated projectile in a training exercise. When determining a user has been hit, the controller 28 sends a notification to an indicator output 30 of the user monitoring device. In the illustrated embodiment, the indicator output 30 comprises an indicator housing 32 supported on one of the straps of the vest 24 in the chest area of the user. The indicator housing 32 supports a speaker 34 and a light 36 thereon which are activated when a hit is recorded.

According to one exemplary system, upon determination of a hit, the controller instructs the speaker 34 to emit an audible notification in the form of a steady tone which notifies the user and those around the user that the user has been hit. The associated weapon of the user is also inactivated in this instance. When it is desired to reset the user, using a coded remote signal from an instructor unit or keyfob for example, the controller ceases the audible notification of a hit. After a prescribed duration has passed, for example approximately one second, the associated weapon of the user is reactivated and the controller instructs the speaker 34 to emit an audible reset notification, for example the speaker may emit the phrase "resurrecting".

Other types of combat training systems 12 may be reset in different manners and use different indicators to indicate a user has been hit, including visual indicators using the light 36, other types of audible notifications using the speaker 34 or outputting an RF signal for example.

According to the illustrated embodiment, the sensory feedback device enabled by adapter assembly 10 for incorporation into the combat training system 12 comprises an electrical impulse device 14. The device 14 includes a main housing 38 which locates a controller therein having a battery and suitable circuitry for delivering an electrical shock to two probes 40 supported externally on the main housing so as to be suitable for being worn against the body of the user. A belt 42 may be provided for carrying the main housing about the waist of the user. The electrical impulse device 14 is arranged to deliver an electrical shock using the probes 40 pressed against the user according to prescribed criteria programmed into the controller upon receipt of an activation signal from an external device.

The adapter assembly 10 generally includes an input sensor 50 and a signal output 52 as described in further detail in the following.

The input sensor 50 includes a sensor housing 54 which is intended for mounting externally onto the exposed face of the indicator housing of a user monitoring device. The housing includes an open inner side arranged for mounting directly against the speaker 34 and light 36 on the exposed face of the indicator housing. The opposing outer side 58 opposite the inner side 56 is fully enclosed and includes electromagnetic shielding thereon. The housing further includes a peripheral flange 60 supported about the full perimeter of the outer side 58 of the housing to project inwardly from the outer side to the inner side. A gasket 61 is mounted about the inner edge of the peripheral flange 60 for providing a peripheral gripping surface for engagement against the exposed face of the indicator housing. The peripheral flange may further be provided with electromagnetic shielding as well.

A printed circuit board 62 is supported within the sensor housing 54 to define a controller of the input sensor. The circuit board supports an electromagnetic sensor 64 thereon against an inner side of the circuit board such that the sensor faces inwardly in proximity to the speaker of the indicator housing upon which the input sensor is mounted. An elongate flexible cord 66 communicates through the peripheral flange 60 between an inner end in connection with the printed circuit board and an opposing outer end locating a connector thereon at a location external of the sensor housing. The cord 66 includes a power cable and a data transmission cable extending therethrough within a common sheath.

The input sensor serves to monitor the electromagnetic field in proximity to the speaker of the indicator housing such that if any variation is found in the electromagnetic field which exceeds a prescribed threshold so as to be indicative of activation of the speaker to emit an audible notification representing a hit to the user, the controller generates an appropriate activation signal.

The controller further includes a timer element such that upon cessation of the audible notification indicative of a hit to the user, the controller then inactivates the activation signal generator for a prescribed duration which is greater than the prescribed reset duration for the user monitoring device. Accordingly, when the user is hit and a first audible notification is generated, the controller is arranged to produce a single activation signal; however, upon resetting the user monitoring device, the audible reset notification emitted within the prescribed duration of the ceasing of the tone indicative of a hit will not produce a subsequent activation signal. Any further activation of the speaker to emit notifications subsequent to the prescribed duration of the timer element lapsing however will generate a new activation signal.

In some embodiments the input sensor 50 may form a direct wired connection to the electrical impulse device 14 such that the signal output 52 simply comprises the wired connection communicating externally from the adapter housing to the electrical impulse device. Power for operating the controller within the input sensor housing in this instance would be derived from the electrical impulse device as communicated through the wired connection for example.

In the illustrated embodiment however, the signal output 52 comprises a transmitter 68 supported within a separate output housing 70 which is independent of the sensor housing and independent of housing of the electrical impulse device 14. More particularly, the output housing includes a printed circuit board 72 supported therein which defines a controller of the output housing and which further includes a battery 74 for supplying electrical power to the components of the signal output and which supports the radio frequency transmitter 68 thereon. The controller is programmable to be synchronized in a dedicated coded communication with a respective electrical impulse device worn by the same user. An external connection 78 on the output housing 70 forms a readily releasable connection to the connector at the end of the flexible cord 66 of the input sensor 50. The sensor housing and the output housing are thus readily separable from one another at the connection 78. The external connection 78 connects the cables of the cord 66 to the circuit board of the signal output 52 such that electrical power can be supplied from the battery 74 of the signal output housing to the circuit board of the input sensor within the sensor housing 54. Likewise any generation of an activation signal by the input sensor 50 is communicated through the cord to the signal output 52 which converts the activation signal into a suitable RF signal coded to be received by the dedicated electrical impulse device which is provided with a radio frequency receiver for receiving the RF activation signal.

For mounting onto the user, the input sensor housing 54 is supported within a fabric pocket 80 which surrounds the sensor housing and which includes integral strap members 82 connected to the pocket to permit the input sensor housing 54 to be held snuggly against the indicator housing by wrapping the strap members 82 about the full circumference of the indicator housing as well as about the corresponding strap portions of the vest supporting the indicator housing thereon. In this manner the sensor housing 54 is held in a fixed but readily releaseable manner relative to the indicator housing, for example by using hook and loop fasteners on the strap members.

Similarly, the signal output housing 70 can also be secured to the vest, for example in the location as shown in broken line in FIG. 1 at the rear of the vest, by providing a suitable fabric pouch which encloses the output housing 70 therein and which further includes integral straps similarly to the input sensor housing for being fully wrapped about respective portions of the vest worn on the user such that the output housing is also mounted in a fixed relation to the vest worn by the user.

In use, when a simulated projectile in the form of a laser is generated by a simulated weapon and strikes one of the sensors of the user monitoring device, the controller of the user monitoring device records a hit and outputs a notification on the speaker of the indicator housing which is indicative of a strike or hit to the user. The adapter assembly then determines a hit using the electromagnetic sensor of the input sensor housing 54 to determine if an activation signal should be generated. The activation signal is communicated to the independent output housing 70 to generate the activation signal in a radio frequency format so that the RF activation signal can then be wirelessly transmitted to the electrical impulse device 14 which delivers an electrical shock to the user together with the determination of the user being hit by the user monitoring device. The additional function of an electrical impulse being delivered to the user can thus be readily incorporated into an existing combat training system in a non-intrusive and readily releasable manner relative to the user monitoring device of the combat training system.

In operation, the M.I.L.E.S. activation sensing device is initially attached by wire to a power supplying device and transmitter. This ensures that power is supplied to the M.I.L.E.S. activation, sensing device circuit board and allows a signal to be sent from the board back to the transmitter. Secondly, the M.I.L.E.S. activation, sensing device is attached with fabric overtop of the M.I.L.E.S. speaker system. This will place the electromagnetic sensor that forms part of the M.I.L.E.S. activation circuit board overtop of the speaker. The circuit is designed to recognize when an electromagnetic field is detected by the electromagnetic sensor. When this occurs a signal will be sent from the circuit board to the device it is attached to. In one example, the signal could be sent to a transmitter. Once the signal is received by the transmitter, it can be sent to another device such as an electrical impulse device. This would allow the M.I.L.E.S. user to utilize existing forms of electrical impulse devices to simulate an injury if they are hit with a laser pulse. When the M.I.L.E.S. gear is activated, the speaker will emit a loud tone. When this occurs, the speaker also produces an electromagnetic wave that radiates out from the speaker. This event will cause the M.I.L.E.S. activation, sensing device to trigger.

The following features may be incorporated into alternative embodiments:

i) Different materials, sizes and textures can be used for all components.

ii) Recognize when the M.I.L.E.S. system has been hit by recognizing when the audio signal is activated by using a localized microphone controlled by a set decibel level. When the speaker system is activated, it produces a unique sound signature. By placing a microphone that only identifies the specific sound of the M.I.L.E.S. vest activation, it will identify when the M.I.L.E.S. vest is activated.

iii) Recognize when the M.I.L.E.S. system has been hit by recognizing when the light system turns on. Using photodiode, photoelectric sensor or some other light sensing device, to cover the light source on the M.I.L.E.S. system. When the light illuminates, it lets my system sense the light. My circuitry will then send a message to the external device to let it know that it has been activated.

iv) Any combination of the three methods as a means of redundancy or validation.

v) The device can be hardwired into the speaker system.

vi) The device could receive an RF from modern M.I.L.E.S. systems that transmitted a coded RF signal.

Since various modifications can be made in my invention as herein above described, it is intended that all matter contained in the accompanying specification shall be interpreted as illustrative only and not in a limiting sense.

The invention claimed is:

1. A combat training system comprising:
   a simulated weapon having an output arranged to wirelessly output a hit signal therefrom which is representative of a projectile in a combat training exercise;
   a user monitoring device arranged to be worn by a user and including an input arranged to receive the hit signal from the simulated weapon and an indicator output arranged to output a user notification in which the user notification is selected from the group consisting of an audible notification, a visual notification, or a combination of the audible notification and the visual notification such that the user notification is adapted to be interpreted by the user as being indicative of the user being hit by a projectile in the combat training exercise in response to the hit signal being received by the input;
   a sensory feedback device arranged to be worn by the user and deliver sensory feedback selected from the group consisting of an electric shock or a vibration which can be felt by the user in response to the sensory feedback device receiving an activation signal; and
   an adapter assembly independent of the user monitoring device and arranged to be supported on the user and being configured to communicate between the user monitoring device and the sensory feedback device, the adapter assembly comprising:
      an input sensor arranged to sense the user notification that was output by the indicator output of the user monitoring device and that was adapted to be interpreted by the user as being indicative of the user being hit by a projectile in the combat training exercise; and
      a signal output arranged to transmit said activation signal as a coded signal dedicated for receipt by the sensory feedback device in response to the user notification being sensed by the input sensor.

2. The system according to claim 1 wherein the signal output of the adapter assembly comprises a wireless transmitter arranged to wirelessly transmit the activation signal.

3. The system according to claim 1 wherein the input sensor of the adapter assembly is supported in a sensor housing and the signal output of the adapter assembly is supported in an output housing, the sensor housing being independent of the output housing so as to be readily releasable from the output housing.

4. The system according to claim 3 wherein the output housing includes a battery supported therein which is arranged to supply electrical power to the signal output and wherein there is provided a power connection for connection between the sensor housing and the output housing such that the input sensor is arranged to be supplied by electrical power from the battery of the output housing.

5. The system according to claim 3 further comprising a data cable arranged to be connected between the sensor housing and the output housing so as to be arranged to communicate detection of the notification by the input sensor from the input sensor to the signal output, the data cable being readily separable from at least one of the sensor housing and the output housing to enable separation of the sensor housing from the output housing.

6. The system according to claim 1 further comprising a sensor housing supporting the input sensor of the adapter assembly therein, the sensor housing being independent of the indicator output of the user monitoring device such that the sensor housing is readily releasable from the user monitoring device.

7. The system according to claim 6 wherein the user monitoring device comprises a vest supporting an indicator housing therein which receives the indicator output therein and wherein the sensor housing further comprises at least one strap member coupled thereto which is selectively securable about the indicator housing of the user monitoring device.

8. The system according to claim 1 wherein the indicator output comprises a speaker arranged to emit the notification as an audible notification, the input sensor of the adapter assembly being arranged to detect the audible notification.

9. The system according to claim 8 wherein the input sensor comprises an electromagnetic sensor arranged to sense an electromagnetic field from the speaker which is indicative of the audible notification.

10. The system according to claim 9 wherein the electromagnetic sensor is received within a sensor housing comprising an inner side arranged to be supported against the speaker and an outer side opposite the inner side which includes electromagnetic shielding thereon.

11. The system according to claim 8 wherein the input sensor comprises a microphone and a signal processor arranged to determine receipt of the notification by comparing an input signal of the microphone to prescribed signal criteria.

12. The system according to claim 1 wherein the indicator output comprises a light arranged to emit the notification as a visual notification, the input sensor of the adapter assembly being arranged to detect the visual notification.

13. A method of incorporating sensory feedback in a combat training system comprising a simulated weapon having an output arranged to wirelessly output a hit signal therefrom which is representative of a projectile in a combat training exercise and a user monitoring device arranged to be worn by a user and including an input arranged to receive the hit signal from the simulated weapon and an indicator output arranged to output a user notification in which the user notification is selected from the group consisting of an audible notification, a visual notification, or a combination of the audible notification and the visual notification such that the user notification is adapted to be interpreted by the user as being indicative of the user being hit by a projectile in the combat training exercise in response to the hit signal being received by the input, the method comprising:
supporting a sensory feedback device on the user which is arranged to deliver sensory feedback selected from the group consisting of an electric shock or a vibration which can be felt by the user in response to the sensory feedback device receiving an activation signal;
providing an adapter assembly independent of the user monitoring device which is configured to communicate between the user monitoring device and the sensory feedback device and which includes an input sensor and a signal output; and
supporting the adapter assembly on the user such that (i) the input sensor is arranged to sense the user notification that was output by the indicator output of the user monitoring device and that was adapted to be interpreted by the user as being indicative of the user being hit by a projectile in the combat training exercise, and (ii) the signal output is arranged to transmit the activation signal as a coded signal dedicated for receipt by the sensory feedback device in response to the user notification being sensed by the input sensor.

14. The method according to claim 13 including providing the input sensor of the adapter assembly in a sensor housing, providing the signal output of the adapter assembly in an output housing, and connecting the sensor housing to the output housing so as to be readily releasable from the output housing.

15. The method according to claim 14 including providing a battery in the output housing which is arranged to supply electrical power to the signal output and providing a power connection which is connected between the sensor housing and the output housing such that the input sensor is arranged to be supplied by electrical power from the battery of the output housing.

16. The method according to claim 13 including providing a sensor housing supporting the input sensor of the adapter assembly therein such that the sensor housing is independent of the indicator output of the user monitoring device and such that the sensor housing is readily releasable from the user monitoring device.

17. The method according to claim 13 wherein the indicator output comprises a speaker arranged to emit the notification as an audible notification, wherein the method includes detecting the audible notification using an electromagnetic sensor of the input sensor which is arranged to sense an electromagnetic field from the speaker which is indicative of the audible notification.

18. The method according to claim 13 wherein the indicator output comprises a speaker arranged to emit the notification as an audible notification in response to the hit signal being received by the input and wherein the indicator output is arranged to cease emitting the audible notification and audibly emit a reset notification within a prescribed duration of the cessation of the audible notification in response resetting of the user monitoring device, wherein the method further includes providing the adapter assembly with a controller including a timer so as to be arranged to generate the activation signal for transmission by the signal output to the sensory feedback device in response to the audible notification and so as to be arranged to prevent generation of a second activation signal in response to receipt of the reset notification within the prescribed duration.

19. A combat training system comprising:
a simulated weapon having an output arranged to wirelessly output a hit signal therefrom which is representative of a projectile in a combat training exercise;
a user monitoring device arranged to be worn by a user and including an input arranged to receive the hit signal from the simulated weapon and an indicator output arranged to output an notification which is indicative of the user being hit by a projectile in the combat training exercise in response to the hit signal being received by the input;
the indicator output comprising a speaker arranged to emit the notification as an audible notification;
the indicator output being arranged to emit the audible notification in response to the hit signal being received by the input and being arranged to cease emitting the audible notification and audibly emit a reset notification within a prescribed duration of the cessation of the audible notification in response resetting of the user monitoring device;

an electrical impulse device arranged to be worn by the user and deliver an electrical shock to the user in response to receiving an activation signal; and an adapter assembly arranged to be supported on the user and being configured to communicate between the user monitoring device and the electrical impulse device, the adapter assembly comprising:

an input sensor arranged to sense the notification output by the indicator output of the user monitoring device by detecting the audible notification;

a signal output arranged to transmit said activation signal to the electrical impulse device in response to the notification signal being sensed by the input sensor; and a controller including a timer so as to be arranged to generate the activation signal for transmission by the signal output to the electrical impulse device in response to the audible notification and so as to be arranged to prevent generation of a second activation signal in response to receipt of the reset notification within the prescribed duration.

* * * * *